US012761003B2

(12) United States Patent
Acker et al.

(10) Patent No.: US 12,761,003 B2
(45) Date of Patent: Oct. 13, 2026

(54) SYSTEM AND METHOD FOR DETECTING A SCATTERED MINEFIELD

(71) Applicant: BAE SYSTEMS INFORMATION AND ELECTRONIC SYSTEMS INTEGRATION INC., Nashua, NH (US)

(72) Inventors: Andrew N. Acker, Honolulu, HI (US); Eric M. Louchard, Miami, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1203 days.

(21) Appl. No.: 17/707,257

(22) Filed: Mar. 29, 2022

(65) Prior Publication Data

US 2023/0314107 A1 Oct. 5, 2023

(51) Int. Cl.

| | |
|---|---|
| ***F41H 11/13*** | (2011.01) |
| ***G06T 7/70*** | (2017.01) |
| ***G06V 20/17*** | (2022.01) |
| ***G06V 20/60*** | (2022.01) |

(52) U.S. Cl.

CPC ................ *F41H 11/13* (2013.01); *G06T 7/70* (2017.01); *G06V 20/17* (2022.01); *G06V 20/60* (2022.01); *G06T 2207/10036* (2013.01); *G06V 2201/07* (2022.01)

(58) Field of Classification Search

None

See application file for complete search history.

(56) References Cited

U.S. PATENT DOCUMENTS

2020/0378751 A1* 12/2020 Acker .................... G06V 20/13

FOREIGN PATENT DOCUMENTS

CN 109444845 B * 5/2023 ........... G01S 7/4802
CN 111445522 B * 5/2023 ........... G06F 18/214

OTHER PUBLICATIONS

Walsh et al, Classification of Mixtures of Spatial Point Processes via Partial Bayes Factors, 2005.*

* cited by examiner

*Primary Examiner* — Fan Zhang

(74) *Attorney, Agent, or Firm* — Sand, Sebolt & Wernow LPA; Gary McFaline

(57) ABSTRACT

Predicting whether objects in an image form a scattered minefield (SMF) is accomplished by a system and method utilizing at least one non-transitory computer readable storage medium having instructions stored thereon. When the instructions are executed by a processor, the instructions implement operations to determine whether the objects define a SMF based on an estimation of a distribution process from which the MLOs are positioned on the surface in the image obtained from the image sensor.

20 Claims, 12 Drawing Sheets

500

SYSTEM AND METHOD FOR DETECTING A SCATTERED MINEFIELD

TECHNICAL FIELD

The present disclosure relates to object detection techniques. More particularly, the present disclosure relates to detection of a scattered mine field or multiple scattered mine fields

BACKGROUND

A mine field or minefield is an area of land or water where explosive mines have been placed. It is advantageous for an entity to detect the presence of a minefield so that personnel can be directed to avoid the minefield. It can also be advantages to detect the presence of a minefield to provide intelligence for the entity trying to detect said minified.

Typically, landmines, or simply mines, may be either randomly scattered or specifically placed to form the minefield. When mines are specifically and purposefully placed, typically in arranged in a line, they are fairly easy to detect using imaging techniques because the shape defined by the placed mines form a distinct shape against the background of an image that can be detected relative to the background in an image using established image processing techniques. The images are obtained by a platform, regardless of whether manned or unmanned, having an imager that is used for surveilling the area from above. However, there may be ground based imagers as well.

The standard approach in detecting patterned minefields (mine lines) in a cluttered background (i.e. a large number of background class of mine-like objects) is to perform a spatial analysis on the entire mine-like object data set and look for the presence of patterned features. There are effective techniques or algorithms for the detection of both straight line and curved line features (i.e., a large number of background class mine-lie objects).

However, scattered minefields (i.e., randomly placed mines) are more difficult to detect using imagery because the randomness (i.e., Gaussian distribution) with which the mines are places throughout terrain. Trying to use these previous techniques Using this approach for detection of scattered minefields is significantly more challenging, it requires detecting a region where inter mine spacing follows an approximate Gaussian distribution (scattered minefield), superimposed on a background where inter-clutter object spacing follows an approximate Poisson distribution.

SUMMARY

The present disclosure provides a technique, process, and system for Scattered Minefield (SMF) detection. The present disclosure relates to the detection of SMFs through the use of imagery.

Typically, the SMFs are scattered by either a person or a machine and they are not in a line but they do have some unique distribution characteristics. The mines in a minefield or SMF differ from background objects or the surface upon which the mines are placed in that they are not bunched together. Stated otherwise, when a person or machine deploys a SMF, the mines have an “anti-bunching” distribution. Generally, this is done to achieve a more efficient coverage of the minefield. This “anti-bunching” characteristic leads to an approximately Gaussian distribution of nearest neighbor distance of the mines within the SMF. In general, the mines typically all have approximately the same size and have a nearest neighbor described by an approximate Gaussian distribution with a mean value significantly larger than the standard deviation. This leads to a low probability of small nearest neighbor distances (i.e., bunching)

The technique of the present disclosure distributes sets of similar objects or mine like objects (MLOs) with similar properties that have been scattered in a background. The present disclosure looks at the background of an image as a whole and then performs a spatial spectral clustering technique to determine whether the objects or MLOs in a certain physical region (i.e., within a certain distance parameter relative to the test MLO) are spectrally similar within a certain similarity parameter relative to the test MLO. The technique can then take that set of objects located within the distance and similarity parameters (relative to the test MLO) and applies various texture parameter techniques to determine whether the set of detected objects likely resembles a SMF. Once the texture parameters have been determined, these texture parameters may be assigned to the test mine or test MLO. This process is repeated with each MLO in the data set serving as the test MLO and results in a set of texture parameters being determined for each MLO in the image data. The technique or protocol may then reveal all of the other objects in the image that have similar design texture parameters so as to determine whether the objects in the image conform to a SMF. Of the selected objects, these techniques determine whether there are sets of objects or sets of mines that look like a SMF. This reveals whether the distribution of the objects appears or is estimated to be a SMF. Once the technique determines that there is potential minefield, it may be mapped on the image as a potential danger zone, which is then fed to a downstream discriminatory processing technique for further evaluation, if needed. For example, the danger zone may be provided to an object classification technique or protocol to take higher resolution imagery to determine whether the objects that are likely SMF, are in fact, mines. Alternatively, the danger zone may be provided as intelligence so that the danger zone can be avoided when an entity is attempting to traverse that region.

One exemplary and non-limiting system and method of the present disclosure implements an imaging sensor that images an area of interest and identifies a set of MLOs within the region, for each MLO a set of metadata is recorded, including size, location and spectrum. The method takes a test mine and looks at the other objects or mines within a certain range. For example, it can determine some number of mines within a certain distance away from the test mine or test object. For example, it could look at 50 mines within 20 meters of the test mine. For each of these sets of mines or objects, the system or technique of the present disclosure can determine how similar, via spectral properties, each object is relative to the test mine or test object. Then, a threshold is applied that can provide all of the objects within a threshold, such as 85% of similar spectral threshold parameters as the test mine. This creates an initial group. From this initial group, the system and technique calculates the local textures. Essentially, system and technique of the present disclosure is looking for objects that have similar spectra, but is not specifying what that spectra has to be. The assumption is that if the objects are close both spatially and spectrally, then they probably arose from the same distribution process.

This exemplary method and technique of the present disclosure tests for spatial properties consistent with a SMF. After the texture parameters are assigned to the MLOs, the system and method then provides a list of or otherwise identifies the MLOs that have a texture that is of interest. Then, clustering is determined to see whether those objects of interest form a cluster and what size of patches or clusters they form. For example, the system may determine or highlight a set of MLOs that form a cluster and identify said cluster by mapping the same. The system may then determine whether the spatial characteristics of that cluster are that of a typical scattered minefield. For example, the system can determine all of the clusters that are about 30-50 meters across. Then these clusters, if they satisfy the local texture parameters within a threshold, may be identified as a danger zone.

The clusters may be referred to as a cluster ellipse, which is a function of the math equation for the distribution of points in space or on the ground. The cluster ellipse is based on utilizing error ellipse functions to identify the points within a certain threshold of a confidence level, such as a 90% confidence level.

In one aspect, an exemplary embodiment of the present disclosure may provide a method comprising obtaining at least one image from a passive image sensor mounted on a platform located above a surface, wherein the surface contains objects that are present in the image obtained from the passive image sensor; classifying the objects based on object detections within the image, wherein the object detections are classified into one of at least two classes, wherein a first class is representative of mine-like objects (MLOs) and a second class is representative of non-mine-like objects; estimating which of the object detections belong to the first class based on an estimation of a distribution process from which the MLOs are on the surface in the image obtained from the image sensor, and estimating which of the object detections belong to the second class based on an estimation of a distribution process from which the objects are on the surface in the image obtained from the passive image sensor; and determining, statistically, whether the object detections classified in the first class define a scattered minefield (SMF), wherein if it is statistically determined that the MLOs are a SMF, then classifying the SMF as a danger zone. This exemplary method or another exemplary method may additionally provide analyzing a spectra and a size of a test detection from a set of object detections; determining whether the test detection is part of the set of object detections with similar spectra and size; and analyzing the spectra and the size of each of the object detections in the set of object detections. This exemplary method or another exemplary method may additionally provide determining whether the set of object detections is within a distance parameter of the test detection. This exemplary method or another exemplary method may additionally provide clustering, statistically, spatial-spectral parameters of the test detection to the set of object detections to identify a population of object detections, wherein any other object detection within the distance parameter of the test detection and within a spectral similarity threshold of the test detection is determined to be a member of the set of object detections. This exemplary method or another exemplary method may additionally provide estimating a distribution process of the set of object detections; and assigning the distribution process of the set of object detections to the test detection. This exemplary method or another exemplary method may additionally provide extracting texture parameters from the set of object detections that were assigned to the test detection. This exemplary method or another exemplary method may additionally provide detecting the SMF by determining at least one texture parameter in the object detections that is indicative that the test detection arose from a SMF-like distribution process; and testing each of the object detections in the set of object detections to determine if a pattern is consistent with that of the SMF. This exemplary method or another exemplary method may additionally provide applying spatial clustering to each of the object detections to identify the set of object detections; and calculating the at least one texture parameter from each of the object detections in the set of object detections and assigning the at least one texture parameter to the test detection. This exemplary method or another exemplary method may additionally provide filtering the set of object detections; and applying a clustering technique the filtered set of object detections based on the at least one texture parameter threshold to obtain a potential SMF cluster. This exemplary method or another exemplary method may additionally provide generating an augmented SMF mine set from the potential SMF cluster by reinserting spatially-spectrally similar detections to a primary SMF list. This exemplary method or another exemplary method may additionally provide determining whether the potential SMF cluster has spatial properties consistent with a SMF prediction, wherein if the potential SMF cluster has spatial properties consistent with the SMF prediction then classifying the potential SMF cluster as the SMF, and wherein if the potential SMF cluster does not have spatial properties consistent with the SMF prediction then classifying the potential SMF cluster as not the SMF. This exemplary method or another exemplary method may additionally provide if the potential SMF is determined to have spatial properties consistent with the SMF prediction, then estimating a boundary of the SMF. This exemplary method or another exemplary method may additionally provide wherein estimating the boundary of the SMF is accomplished by fitting a confidence level ellipse to the augmented SMF mine set.

In another aspect, an exemplary embodiment of the present disclosure may provide a method comprising: effecting an image to be obtained from an image sensor mounted on a platform moving above a surface, wherein the surface contains one or more mine like objects (MLOs) and the MLOs are present in the image obtained from the image sensor; and effecting a statistical determination of whether the MLOs define a scattered minefield (SMF) based on an estimation of a distribution process from which the MLOs are positioned on the surface in the image obtained from the image sensor; wherein if it is statistically determined that the MLOs are a SMF, then effecting the SMF to be classified as a danger zone that is to be avoided. This exemplary embodiment or another exemplary embodiment may further provide wherein effecting the statistical determination of whether the MLOs define the SMF comprises: effecting spectra and size of a test MLO from a set of MLOs to be analyzed; effecting a determination of whether the test MLO is part of the set of MLOs with similar spectra and size; and effecting spectra and size of each MLO in the set of MLOs to be analyzed. This exemplary embodiment or another exemplary embodiment may further provide effecting detection of the SMF from a determination of at least one texture parameter in the MLOs that is indicative that the test MLO arose from a SMF-like distribution process; and effecting each MLO in the set of MLOs to be tested to determine if a pattern is consistent with that of a SMF. This exemplary embodiment or another exemplary embodiment may further provide effecting spatial clustering to be applied to each MLO to identify the set of MLOs; effecting texture parameters to be calculated from each MLO in the set of MLOs and assigning the texture parameters to the test MLO. This exemplary embodiment or another exemplary embodiment may further provide effecting a clustering technique to be applied to the set of MLOs that have been filtered based on at least one texture parameter threshold to obtain a potential SMF cluster; effecting an augmented SMF mine set from the potential SMF cluster to be generated by reinserting spatially-spectrally similar MLOs to a primary SMF list; effecting a determination of whether the potential SMF cluster has spatial properties consistent with a SMF prediction, wherein if the potential SMF cluster has spatial properties consistent with the SMF prediction then effecting a classification that the potential SMF cluster as the SMF, and wherein if the potential SMF cluster does not have spatial properties consistent with the SMF prediction then effecting a classification that the potential SMF cluster is not the SMF; if the potential SMF is determined to have spatial properties consistent with the SMF prediction, then effecting a boundary of the SMF to be estimated; wherein estimation of the boundary of the SMF is accomplished by effecting a confidence level ellipse to be fitted to the augmented SMF mine set.

In yet another aspect, another exemplary embodiment of the present disclosure may provide an object classification system comprising: a platform; a passive sensor carried by the platform, wherein the passive image sensor is configured to image a landscape containing objects; classification logic in operative communication with the passive sensor, the classification logic configured to classify the objects based on detections within the image, wherein the classification logic classifies detection of the objects into one of at least two classes of objects, wherein a first class is representative of mine-like objects (MLOs) and a second class is representative non-mine-like objects; the classification logic configured to estimate which detections belong to the first class based on an estimation of a distribution process from which the MLOs are positioned in the landscape in the image obtained from the passive image sensor, and estimate which detections belong to the second class based on an estimation of a distribution process from which the objects are positioned in the landscape in the image obtained from the passive image sensor; and the classification logic configured to determine, statistically, whether detections of objects classified in the first class define a scattered minefield (SMF), wherein if it is statistically determined that the MLOs are a SMF, then the classification logic configured to classify the SMF as a danger zone that is to be avoided. This exemplary embodiment or another exemplary embodiment may further provide the classification logic configured to analyze spectra and size of a test detection from a set of detections, determine whether the test detection is part of the set of detections with similar spectra and size, and analyze spectra and size of each detection in the set of detections; the classification logic configured to determine whether the set of detections is within a distance parameter of the test detection; the classification logic configured to cluster, statistically, spatial-spectral parameters of the test detection to the set of detections to identify a population of detections, wherein any other detection within the distance parameter of the test detection and within a spectral similarity threshold of the test detection is determined to be a member of the set of detections; the classification logic configured to estimate a distribution process of the set of detections, and assign the distribution process of the set of detections to the test detection; and the classification logic configured to extract texture parameters from the set of detections that were assigned to the test detection.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The present disclosure relates to addressing and solving a problem that is needed for improved clutter suppression techniques and a resultant output that is used for detecting objects, such as SMFs formed from landmines. Exemplary moving platforms include airborne vehicles, sea-based vehicles, moving land vehicles, or space vehicles, regardless of whether these platforms are manned or unmanned. Alternatively, the system of the present disclosure may be mounted on a static non-moving structure. Further, the detection of objects is not limited to landmines. The present disclosure is equally applicable to non-warfare objects. As such, it is to be understood that the techniques presented herein may have commercial applications for detecting and classifying any type of object having a Gaussian-like distribution on a surface.

The system of the present disclosure utilizes frames in a video sequence or streams of sequential images of imagery, such as visible (VIS) infrared (IR) imagery, which may be of multiple bands (i.e. multichannel—different parts of the: infrared spectrum and or visible spectrum) that are captured together. The system of the present disclosure utilizes an image or image frame to detect, look for, or otherwise identify SMFs. Stated otherwise, the system of the present disclosure is not necessarily and explicitly trying to detect specific phenomenology of a specific threat or object, but rather the system of the present disclosure quantifies the spectral distributions to find regions in that imagery that are likely a SMF. The system of the present disclosure utilizes spectral information of multiple candidate objects within a set of objects for detection and further analysis in a downstream and more precise, highly discriminatory, object detection and identification technique.

One exemplary feature of the present disclosure provides a clutter suppression technique that is the first component or first step of a threat warning or object detection process. The present disclosure determines candidate detections of MLOs in imagery that can then be fed to another algorithm or logic for more specialized processing to determine whether the candidate object is something of interest or not.

Figure 1:
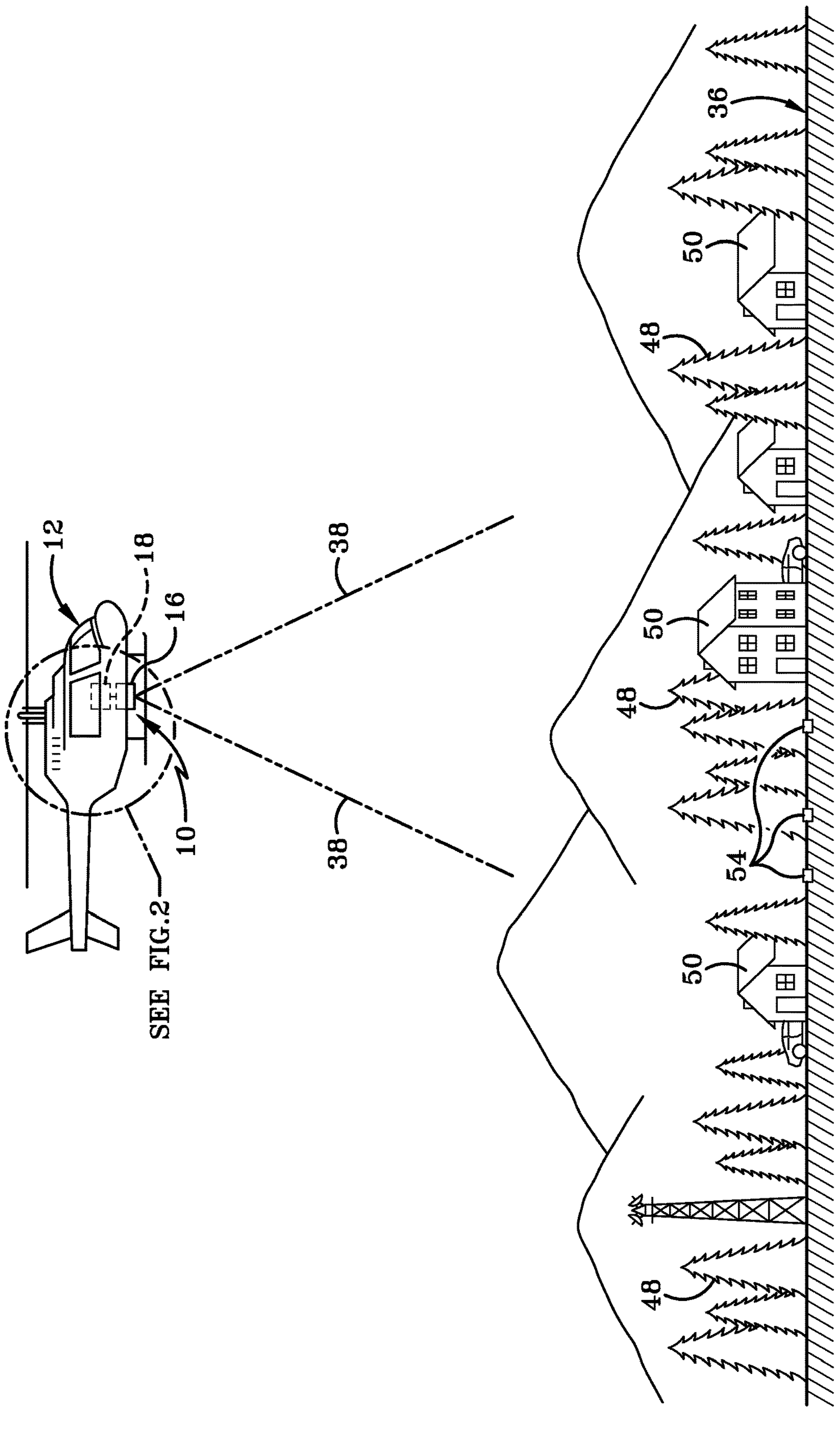
FIG. 1 is a diagrammatic view of a platform carrying an exemplary object detection system that implements a process of the present disclosure for detecting or classifying a scattered minefield.

FIG. 1 diagrammatically depicts an object or threat detection system in accordance with certain aspects of the present disclosure is shown generally at 10. The object detection system 10 is operably engaged with a platform 12 and includes at least one image sensor 16, and at least one processor 18 having spectral data logic 20.

In accordance with one aspect of the present disclosure, the platform 12 may be any moveable platform configured to be elevated relative to a geographic landscape 36. Some exemplary moveable platforms 12 include, but are not limited to, manned aerial vehicles, unmanned aerial vehicles (UAVs), guided projectiles, or any other suitable moveable platforms.

When the platform 12 is embodied as a moveable aerial vehicle, the platform 12 may include a front end or a nose opposite a rear end or tail. Portions of the detection system 10 may be mounted to the body, the fuselage, or internal thereto between the nose and tail of the platform 12. While FIG. 1 depicts that some portions of the threat detection system 10 are mounted or carried by the platform 12 adjacent a lower side of the platform 12, it is to be understood that the positioning of some components may be varied and the figure is not intended to be limiting with respect to the location of where the components of the system 10 are provided. For example, and not meant as a limitation, the at least one sensor 16 is mounted or carried on the platform 12. Furthermore, some aspects of the at least one sensor 16 may be conformal to the outer surface of the platform 12 while other aspects of the at least one sensor 16 may extend outwardly from the outer surface of the platform 12 and other aspects of the at least one sensor 16 may be internal to the platform 12.

The at least one sensor 16 may be an optical sensor mounted on the lower side of the platform 12. The at least one sensor 16 is configured to observe scenes remote from the platform 12, such as, for example, a geographic landscape 36 within its field of view (FOV) 38. Inasmuch as the at least one sensor 16 has a FOV 38, and in one example, the at least one sensor 16 is an image sensor or imager. Further, when the at least one sensor 16 is embodied as an imager, the imager may be any imager capable of imaging terrain, such as, for example, a visible light imager, an infrared (IR) imager, a near-infrared imager, a mid-infrared imager, a far-infrared imager, or any other suitable imager. In one example, the imager may have a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate. The imager, or the at least one sensor 16, may be an active sensor or a passive sensor. However, certain aspects of the present disclosure are operative with the at least one sensor 16 being a passive sensor 16. An active sensor 16 would refer a sensor that receives data of the scene that is being observed in response to signals transmitted from the sensor (such as radar or LIDAR). A passive sensor 16 or imager would refer to the fact that the at least one sensor 16 or the imager receives data observed through its FOV 38 of the scene that is being observed without having to generate a signal outward from the sensor to obtain a responsive signal. Sensor 16 may be one of many sensors on platform 12, such as a plurality of IR sensors or IR imager, each including at least one focal plane array (FPA). Each FPA comprises a plurality of pixels. One particular imager that can embody sensor 16 is a multispectral IR imager (i.e., at least dual-band IR imager) for mine detection. The selection of wavebands and the number of bands is tuned for mine detection to obtain data sets based on the spectral bands that were previously implemented in other mine detection protocols.

Furthermore, when the at least one sensor 16 is embodied as an imager, the imager will have some components that are common to image sensors such as lens, filters, domes, focal plane arrays, and may additionally include processors such as a Graphical Processing Unit (GPU) and associated processing hardware. Towards that end, a reader of the present disclosure will understand that the at least one sensor 16 may include standard imaging components adapted to sense, capture, and detect imagery within its FOV 38. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOV 38 in FIG. 1 is directed vertically downward towards the geographic landscape 36, it is further possible for a system in accordance with the present disclosure to have a sensor 16 that projects its FOV 38 outwardly and forwardly from the nose of the platform 12 or outwardly and rearward from the tail of the platform 12, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12.

Generally, the sensor 16 has an input and an output. An input to the sensor 16 may be considered the scene image observed by the FOV 38 that is processed through the imagery or sensing components within the sensor 16. An output of the sensor may be an image captured by the sensor 16 that is output to another hardware component or processing component.

Figure 2:
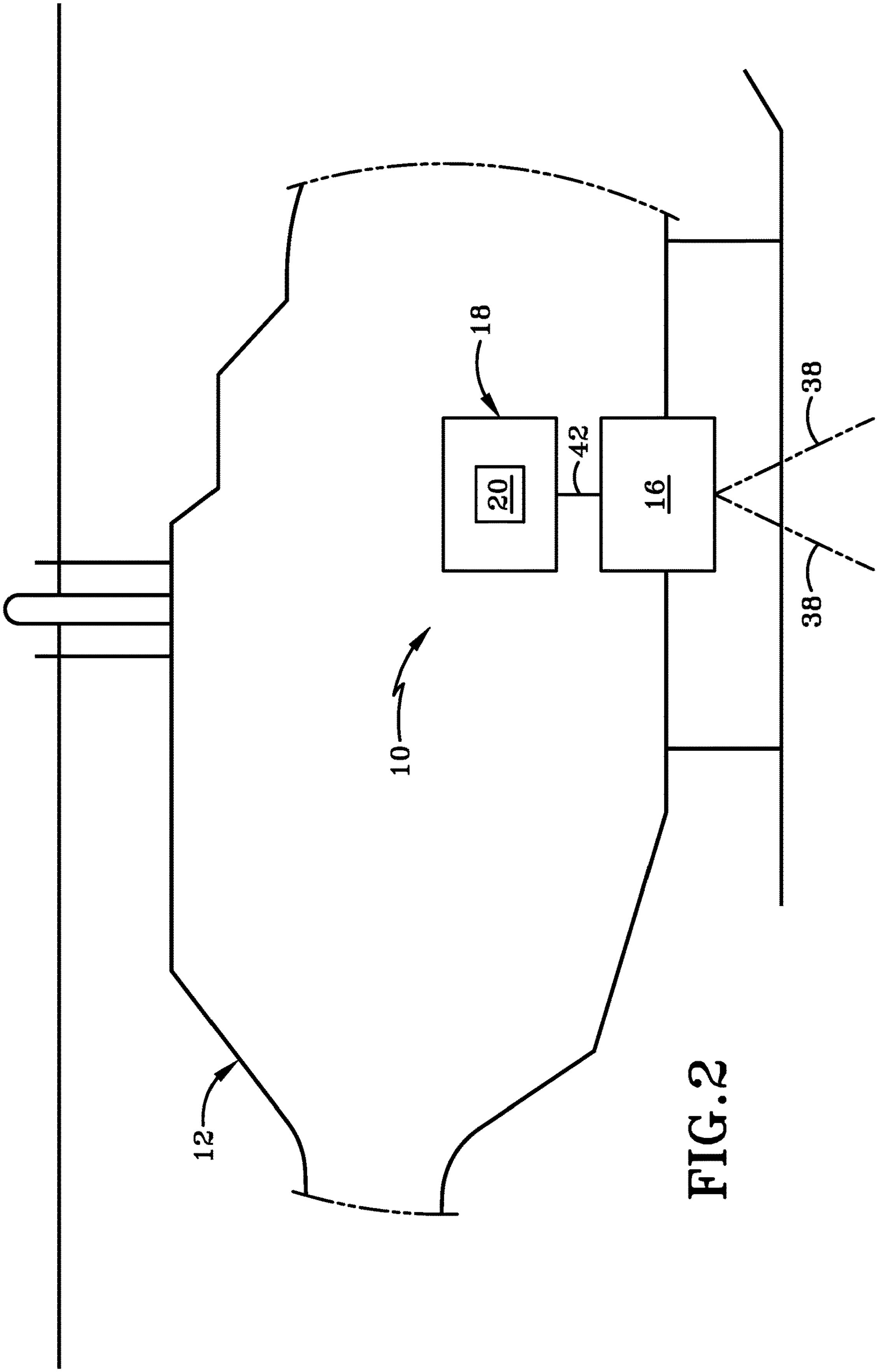
FIG. 2 is an enlarged schematic view of a portion of the platform carrying the object detection system as highlighted by the dashed circle labeled "SEE FIG. 2" from FIG. 1

FIG. 2 depicts the at least one processor 18 is in operative communication with the at least one sensor 16. More particularly, the at least one processor 18 is electrically connected with the output of the sensor 16. In one example, the at least one processor 18 is integrally formed within sensor 16. In another example, the processor 18 is directly wired the output of the sensor 16. However, it is equally possible for the at least one processor 18 to be wirelessly connected to the sensor 16. Stated otherwise, a link 42 electrically connects the sensor 16 to the at least one processor 18 and may be any wireless or wired connection, integral to the sensor 16 or external to sensor 16, to effectuate the transfer of digital information or data from the sensor 16 to the at least one processor 18. The at least one processor 18 is configured to or is operative to generate a signal in response to the data received over the link 42 from the sensor 16.

In some implementations, the data that is sent over the link 42 are scene images or video streams composed of sequential frames captured by the sensor 16 that is observing the geographic landscape 36 below through its FOV 38. As will be described in greater detail below, the at least one processor 18 may include various logics, such as, for example, the spectral data logic 20 that which performs functions described in greater detail below.

With continued reference to FIG. 1, and having thus described the general structure of system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from the platform 12 through the FOV 38 of the sensor 16. Also within the FOV 38 is a candidate object or MLO, such as mines 54, which may be a threat or another object of interest.

The system 10 uses the sensor 16 to capture a scene image from a scene remotely from the platform 12 and the at least one processor 18 generates a signal in response to the sensor 16 capturing the scene image. Metadata may be provided for each captured scene image. For example, and not meant as a limitation, the metadata may include a frame number of the scene image within a flight data set, a latitude position of the platform 12 in radians, a longitude position of the platform 12 in radians, an altitude position of the platform 12 in meters, a velocity of the platform 12 in meters per second, and a rotation of the platform 12 in degrees. Metadata associated with the at least one sensor 16 may also be provided, such, as, for example, mounting information related to the at least one sensor 16. Although examples of metadata have been provided, it is to be understood that the metadata may include any suitable data and/or information.

Spectral data logic 20 includes at least one non-transitory computer readable storage medium having instructions encoded thereon that, when executed by the at least one processor 18, implements operations to obtain a single band or multiple bands (i.e. multichannel—different parts of the infrared spectrum) of image data that are captured together in an image or in a frame of a video stream from the sensor 16.

In accordance with one aspect of the present disclosure, the processor 18 may be a graphical processing unit (GPU) that is performing the processing functionality to detect the candidate object based on the clutter suppression technique described herein, which is a portion of an anomaly detection method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to generate a detection of a candidate object at that pixel.

Additionally, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Having thus described the components of the system that implement the clutter suppression techniques, protocols, process, or methods detailed herein, reference is now made to its operation and the mathematical operations that accomplish said operation of the system.

The system utilizes image sensor 16 carried by moving platform 12 regardless whether the platform is manned or unmanned, to capture imagery of the ground surface 36. The processor 18 that is used in conjunction with the imager sensor 16 can also be used as a preprocessor to look for objects that do not look like a SMF and discard the object detections that do not look like a scattered minefield. Accordingly, the system and method of the present disclosure can be considered as a type of background rejection filter.

In operation, a region is interrogated with image sensor 16 and a set of MLOs, such as mines 54, are detected via processor 18. Each of these detections is accompanied by a set of metadata including Position (x) Spectrum (S) and Size (SZ). The observed set of MLOs has a distribution $$P(\mathrm{MLO})=P_{MLO}(x,s,sz) \quad \text{(Equation 1)}$$

In one embodiment, the method implemented by system 10 assumes that the observed distribution of MLOs is the sum of multiple distribution processes: background distribution, patterned mine distribution and scattered mine distribution. Thus $$P_{MLO}(x,s,sz)=P_{Background}(x,s,sz)+P_{Patterened}(x,s,sz)+P_{scattered}(x,s,sz) \quad \text{(Equation 2)}$$

Note that the MLOs belonging to the $P_{Background}$ distribution are non-mines while the MLOs belonging to the $P_{Patterened}$ and $P_{Scattered}$ distributions are mines 54. These distributions have different spatial characteristics.

In general, the spatial distribution of background MLO objects, as described by the MLO-to-MLO spacing, is characterized by a Poisson-like distribution. Notably background MLOs can exhibit "bunching" thus adjacent MLOs can overlap. Background MLOs can exhibit some spatial patterning, for example, background MLOs can follow environmental boundaries such as the vegetation line in a beach zone.

The inter-MLO spacing of patterned MLOs follows a very regular distribution, characterized by a Gaussian distribution with a small standard deviation (σ), relative to the mean spacing (μ). By definition, these MLOs are distributed in an approximately fixed pattern, usually along a straight or curved line. These MLOs are characterized by having a non-isotropic spatial distribution.

The inter-MLO spacing of scattered MLOs also follows a Gaussian-like normal distribution. The mines 54 are scattered so they do not lay next to each other (sometimes referred to as an anti-bunching distribution). In general, the standard deviation (σ), is small relative to the mean spacing (μ), but somewhat larger than in the case of Patterned MLOs. Finally, the mines 54 in a scatted minified or SMF are characterized as having an isotropic spatial distribution. SMFs typically have a limited extent, typically elliptically shaped and about 30-50 meters across.

The spatial characteristics of the Background patterned and scattered MLO distributions $P_{Background}(x)$, $P_{Patterened}(x)$, $P_{Scattered}(x)$ are summarized in Table 1.

TABLE 1

| | Background | Patterned | Scattered |
|---|---|---|---|
| Inter MLO spacing distribution type | Poisson | Gaussian | Gaussian |
| Inter MLO spacing $R = \frac{\sigma}{\mu}$ | $R_{Patterned} \sim 1$ | $R_{Patterned} = 1$ | $\left\{ \begin{array}{l} R_{Patterned} < R_{Scattered} \\ < R_{Background} \end{array} \right\}$ |
| Isotropy | Variable/depends on sample | Non isotropic (linear) | isotropic |
| Minefield extent | No defined extent Background MLOs~randomly distributed in MLO dataset | Series of line segments Typically 10 m to 100 m in length | ~30 m-50 m roughly elliptically shaped |

The types of MLOs in Background, Patterned and Scattered distributions differ as well. As stated previously the MLOs in the background distribution are non-mines, beyond this, this example has no a priori way of specifying the constituent MLO types.

The techniques presented herein can improve in specifying the distribution of MLO typed in patterned and scattered minefields. By definitions, these MLOs are all mines, and thus the present disclosure assumes that there were only a limited set of mine type available when the field was laid. In the case of patterned minefields, if there are N mine line MLOs in the data set consisting of M mine types with M=N $$P_{Patterened}(x, s, sz) = \sum_{i=1}^{M} P_{Patterened}(x, s_i, sz_i) \quad \text{(Equation 3)}$$

Specifically for a mine line, the present disclosure considered the line to consist if M segments, where each segment is composed of similar (in spectra and size) mines. Here the spatial distribution properties of each line segment are consistent with the specifications of Table 1.

Similarly For scattered mine field of N mines, it may consist of M mine types with M=N.

$$P_{Scattered}(x, s, sz) = \sum_{i=1}^{M} P_{Scattered}(x, s_i, sz_i) \quad \text{(Equation 4)}$$

This example considered a scattered mine field to consist of M scattered component minefields, each of which are composed of similar mines. Again, the spatial distribution properties of each line segment are consistent with the specifications of Table 1. The spatial extent of the component scattered-minefield is taken to be the same as the aggregate minefield. The inter mine spacing will still be normally distributed, but the average inter mine spacing will be larger than in the aggregate mine field.

In order to be detected, a SMF of the present disclosure locates spatial regions within the data set where the MLOs follow a scattered mine distribution as specified herein.

The present disclosure provides a scattered minefield or SMF detection technique that evaluates each MLO in a data set individually and estimates the distribution process from which it arose. The approach is suggested by Equation 4 which states that a SMF is composed of sets of mines 54, with similar spectra and size. Thus, if a test MLO ($MLO_i$) is a member of a SMF, then it is part of a population of MLOs, $\{MLO\_S_i\}$ with similar spectra and size. Further, this population $\{MLO\_S_i\}$ is located near $MLO_i$. Wherein "near" refers to within the length scale of a typical scattered mine field.

The present disclosure employs spatial-spectral clustering to identify the population $\{MLO\_S_i\}$. Any $MLO_j$ within "range threshold" of $MLO_i$ and "spectral similarity threshold" of $MLO_i$ is a member of $\{MLO\_S_i\}$. That is, $$\begin{aligned} &\text{if Range } (MLO_i, MLO_j) < \text{Threshold}_{Range} \\ &\text{and} \\ &Ssim(MLO_i, MLO_j) > \text{Threshold}_{Ssim} \\ &\textit{then} MLO_j \in \{\text{MLO\_S}_i\} \end{aligned} \quad \text{(Equation 5)}$$

wherein $Ssim(MLO_i, MLO_j)$ is a spectral similarity function. For spectral clustering to be effective the MLO spectral metadata must have sufficient resolution. Data collected with sensor 16, may be a 6-band MSI sensor such as BAE systems Pelican Sensor that has been determined to support effective spectral clustering. Once $\{MLO\_S_i\}$ is identified, its distribution process can be estimated and assigned to $MLO_i$.

Figure 3:
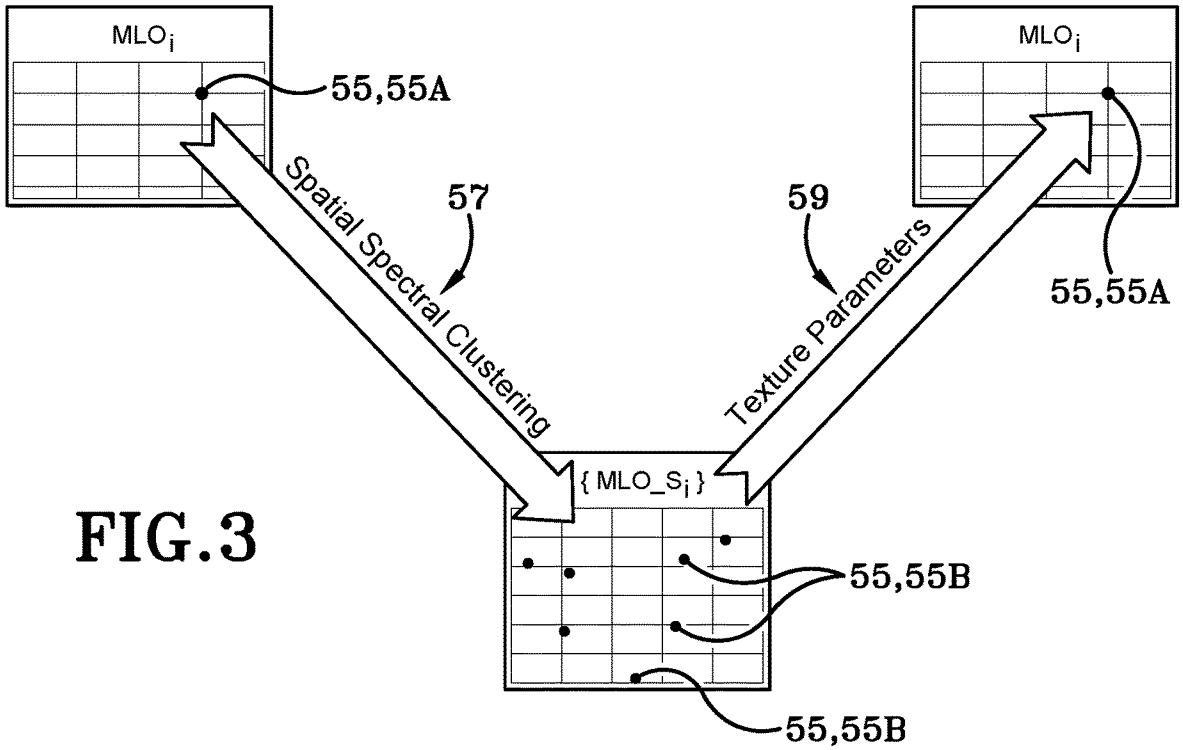
FIG. 3 is an operational schematic view of an exemplary process of the present disclosure.

FIG. 3 depicts the process of assigning texture parameters to individual MLOs. An initial MLO 55, which may be a mine 54, is identified as a test MLO ($MLO_i$) 55A. Spatial spectral clustering 57 is applied and evaluated against the set or population {$MLO\_S_i$} 55B. Parameters extracted from {$MLO\_S_i$} 55B and assigned to $MLO_i$ 55 are referred to as texture parameters 59.

From the texture parameters and the information in Table 1 it is seen that the present disclosure can assign the most likely distribution process (Background, Patterned or Scattered) to each MLO.

If $MLO_i$ is instead a member of a patterned minefield, the situation is the same. Notably, the similarity between Equation 3-4 and the texture parameters assigned to $MLO_i$ would be those represented of a patterned distribution process.

Finally, in the case where $MLO_i$ is a background MLO. The example has no specific model as to the composition of background MLOs by MLO type. In this context MLO type refers to background MLOs with similar spectra and size. This example assumes that each background MLO type has a Poisson like distribution function The Scattered Mine Field (SMF) detection technique of the present disclosure detects SMFs by: 1) looking for MLOs whose texture parameters indicate they arise from a SMF-like distribution process, and 2) testing the MLOs so identified to determine if the pattern is consistent with a SMF. Note that the objective of the detection technique is to detect minefields not individual mines.

Figure 4:
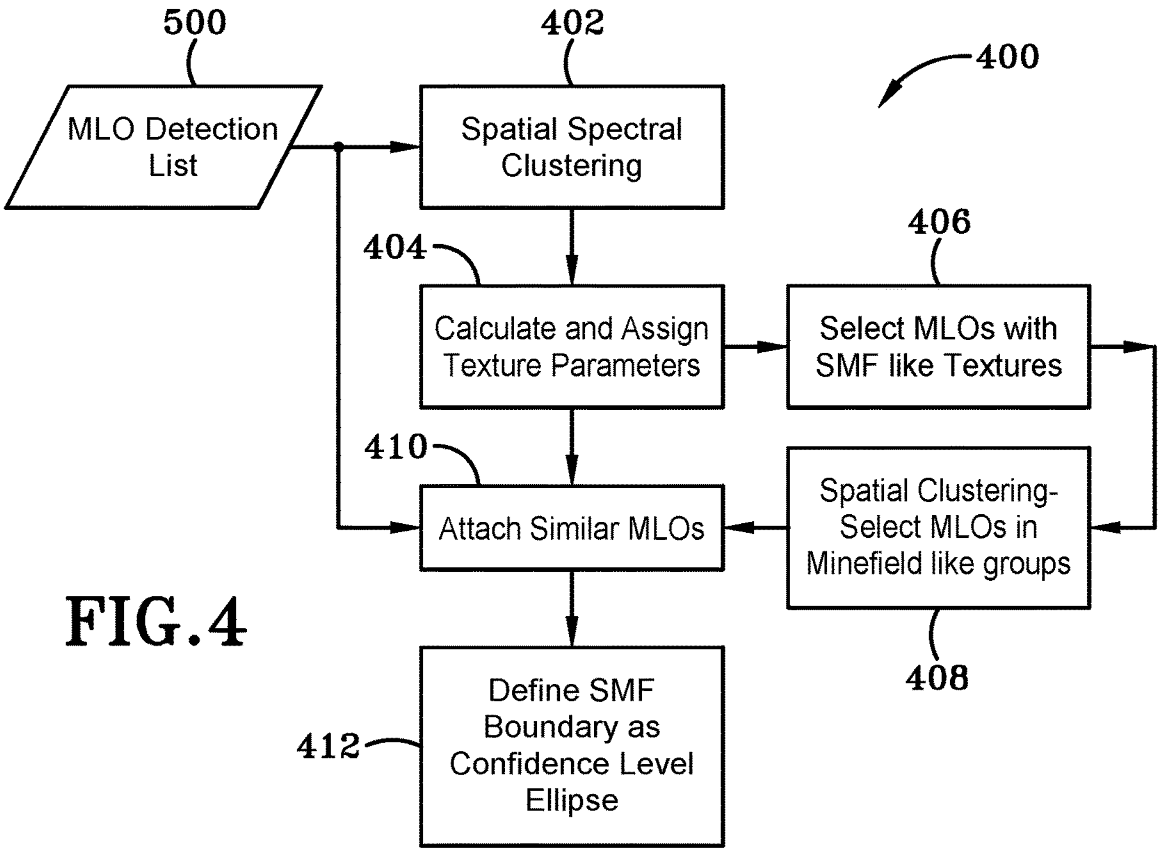
FIG. 4 is a flow chart according to an exemplary aspect of the present disclosure.

The technique or process is illustrated in FIG. 4 generally as method 400. In the first step, spatial spectral clustering is applied to each MLO to identify a set of similar MLOs 55B, which is shown generally at 402. In the second step texture parameter are calculated from the MLO set 55B and assigned to the test MLO 55A, which is shown generally at 404. Steps 402 and 404 are the implementation of the process illustrated in FIG. 4. The MLO data set 55B is then filtered by texture parameter values, which is shown generally at 406. A clustering algorithm or technique is applied to the MLO set 55B passing the filtering operation, which is shown generally at 408. The clusters are tested for spatial properties consistent with a SMF. Mines 54 or (MLOs 55) passing this cluster test are considered elements of a SMF. In the next step the MLO element identified on step 402 are re-associated with these mines are added to the SMF mine set, which is shown generally at 410. Here, the method assumes that these MLOs 55 that are spatially and spectrally close to the SMF mine set should also be considered as part of the SMF. In the final step, the SMF boundary is estimated by fitting a confidence level ellipse to the augmented SMF mine set, which is shown generally at 412. These processes are detailed further herein.

Predicting whether objects or MLOs in the image form a SMF is accomplished by a system and method of the present disclosure and utilizes logic or at least one non-transitory computer readable storage medium (on platform 12) having instructions stored thereon. When the instructions are executed by a processor, the instructions implement operations to determine whether the objects define a SMF based on an estimation of a distribution process from which the MLOs are positioned on the surface in the image obtained from the image sensor. These instructions effectuate the application of method 400.

The spatial and spectral clustering of step 402 is based on the implementation of Equation 5 which outputs the set of spectrally spatially adjacent MLO's {$MLO\_S_i$} 55B. A Range function $Range(MLO_i, MLO_j)$ is the distance in meters between MLOs i and j. The spectral similarity function $Ssim(MLO_i, MLO_j)$ is the spectral coherence between MLOs i and j. This is given by $$Ssim(MLO_i, MLO_j) = Wn_i \cdot Wn_i \quad \text{(Equation 6)}$$

wherein $Wn_i$ is the normalized whitened spectral vector. And, $$Wn_i = |s_i \times \Sigma^{-1/2} \quad \text{(Equation 7)}$$

where $s_i$ is the spectral vector and $\Sigma$ is the spectral covariance matrix calculated from the entire MLO dataset. The spectral similarity identifier is effectively self-weighted for each data set.

The calculation of texture parameters of step 404 are calculated from the set{$MLO\_S_i$} 55B. These are listed in Table 2.

TABLE 2

| # | Name | Description |
|---|---|---|
| 1 | threshold | The $Threshold_{Ssim}$ value used in Equation 5 $Threshold_{Ssim}$ = 0.75 worked well in testing |
| 2 | range_treshold | The $Threshold_{Range}$ value used in Equation 5 $Threshold_{Ssim}$~30 m(SMFsize) |
| 3 | Number of Detections (NDets) | Number of MLOs in {$MLO\_S_i$} NDets = 3 recommended |
| 4 | Density | NDets/π · $(Threshold_{Range})^2$ Approximate # MLOs per $m^2$. |
| 5 | Centroid_latitude | mean latitude of {$MLO\_S_i$} |
| 6 | Centroid_longitude | mean longitude of {$MLO\_S_i$} |
| 7 | local_detections | List of all detections in {$MLO\_S_i$} |
| 8 | mean angle | mean angle between $MLO_i$ and {$MLO\_S_i$} |
| 9 | sigma_angle | Standard deviation of the angles between $MLO_i$ and {$MLO\_S_i$} |
| 10 | isotropy | (sigma_angle/expected sigma_angle for an isotropic angular distribution),: $\left(\frac{\sigma_{angle}}{52°}\right)$ isotropy~1 indicates random isotropic distribution, isotropy~0 indicates linear distribution |
| 11 | Mean Nearest Neighbor (Mean NN) | mean nearest neighbor distance between all MLOs in {$MLO\_S_i$} |
| 12 | Sigma NN | Standard deviation of nearest neighbor distance between all MLOs in {$MLO\_S_i$} |
| 13 | spacing uniformity | SigmaNN/meanNN, value~1 indicates Poisson-like distribution (background) distribution). value << 1 indicates regular Gaussian distribution (scattered or patterned MF) |
| 14 | Mean Farthest Neighbor (Mean FN) | mean farthest neighbor distance between all MLOs in {$MLO\_S_i$} |
| 15 | extent | maximum distance between any 2 MLOs in {$MLO\_S_i$}. Provides a measure of the linear extent of {$MLO\_S_i$} |
| 16 | Mean Area | mean area (in pixels) of all MLOs in {$MLO\_S_i$} |
| 17 | Sigma Area | Standard deviation of area (in pixels) of all MLOs in {$MLO\_S_i$} |
| 18 | Area uniformity | sigmaArea/meanArea |
| 19 | texture vector | To support future texture covariance analysis a vector of six texture parameters is added to the texture metadata. These parameters are: 1 Density 2 isotropy 3 meanNN 4 spacing_uniformity 5 meanArea 6 Area_uniformity This parameter is calculated to support optional texture covariance analysis |

One exemplary texture parameter from Table 2 that is used is based on the location of a mine and a certain number of mines that are within a given area based on similar spatial and spectral parameters. This develops a cluster and is able to determine the nearest neighbor spacing of the nearest mine-like object and determine how linear that distribution is. If the mines within a cluster are analyzed with respect to a test mine, the system can determine exemplary parameters, such as the angular distribution that the mines have, and conclude that if the angle distribution is very small, then the mines may be in a straight line. For the scattered mine scenario, the system looks for the objects in the cluster that are not in a line and those are identified and used as a way to find local patterns. The system is able to utilize local textures, with features of a physical object within a certain area from a test object. The local textures refer to spectral features or similarities between objects in a cluster. The system utilizes spatial properties of the distribution of objects within the cluster, such as the distribution of nearest neighbor spacing, or the distribution of angles relative to the test mine, or the distribution of sizes, or the like. These spatial parameters of the group of selected objects from spatial spectral clustering is considered to be a local texture. Stated otherwise, the local texture refers to spatial parameters and object-size parameters of the group selected from spatial spectral clustering. For each mine, the system determines what mines or objects are near to the test mine and are similar to it. The system performs a range threshold and a spectral threshold to obtain a number of objects that are similar to the test mine. From that distribution of ten or so objects, there is a set of statistics, such as their spatial distribution, their size distribution, the angle distribution, or the like. The distribution function of the similar group of mines is calculated and then assigned back to the test mine. The test mine is first selected and repeated such that every potential mine-like object in the cluster is evaluated against the other objects. Stated otherwise, a first object is selected to be a test mine and the distribution parameters are applied to it, then, the process repeats itself again for another object being the test mine. This process is repeated for all of the mine-like objects in the cluster. Then, once completed, a set of mine-like objects each has a texture parameter associated with it because each has been the test mine at least once in the calculation. From there, the texture parameters are able to determine whether there are significant or interesting groupings that would suggest that the objects are a scattered minefield. The present disclosure provides additional metadata associated with each of those detections that can be used for looking for scattered minefields. Typical metadata includes the spectra of the mine, its position, its size, the number of pixels but does not have any information about how the object was placed in its location. From there, assumptions need to be made whether it arrived from a Gaussian-like distribution or from a Poisson like distribution.

As identified in Table 2, the threshold parameter is the spectral similarity threshold identified and defined by Equation 6. The spectral similarity threshold would be 0 if the spectra were exactly the same between two objects. Thus, the threshold may be set at 0.75, which is sufficient based on testing results. Range threshold refers to how close the objects are spatially.

With respect to the texture parameters of Table 2, the mean angle refers to the mean angle between the test mine and each of the other mine-like objects in the list. The mean of the group of these angles is equivalent to the mean angle. This provides an average mean as to what direction those mines are scattered from the test object. The sigma angle refers to the standard deviation of the angles between the test object and the other list of mine-like objects. If sigma angle is zero, then it would refer to everything being in a straight line. The sigma angle is used in the next parameter isotropy that is a sigma angle over 52°, wherein 52° is the standard deviation of the angle if they were completely randomly distributed. For scattered minefields, the isotropy should be close to a value of one.

Another parameter that is used is the nearest neighbor distance between the mine-like objects. As identified in Table 2, the system and method of the present disclosure calculates the mean nearest neighbor and the standard deviation or sigma nearest neighbor. This results in the determination of the spacing uniformity, which is the sigma nearest neighbor distance over the mean nearest neighbor distance.

At step 406, filtering the texture parameter, the system may apply a filter to the texture parameters calculated above to select MLOs of the desired texture type. In normal operation the parameters are chosen to select SMF-like MLOs. However, the algorithm can be run as a false alarm mitigation tool prior to straight line or curved line detection. In this case, parameters are chosen in order to detect background like MLOs. An example set of filter test parameters are listed in Table 3. However, note that Table 3 is simply an example of test parameters and for different applications, different parameter sets may be used. This process generates a filtered detection list.

TABLE 3

| # | Parameter | Description | "SMF detection Sample values |
|---|---|---|---|
| 1 | Minimum detections | Must be ≥2 | 3 |
| 2 | Maximum detections | | 1000 dummy |
| 3 | Min NN Distance | SMF Spacing ~5 meters | 2 |
| 4 | Max NN Distance | SMF Spacing ~5 meters | 16 |
| 5 | Min isotropy | ~0.3 rejects mine lines | 0.33 |
| 6 | Max isotropy | use large value for SMF | 100 |
| 7 | Max Spacing Uniformity | BR has SU~1 | 0.3 |
| 8 | Min Spacing Uniformity | Set to 0 for SMF | 0 |
| 9 | Min Area | Mine area in pixels | 0 |
| 10 | Max Area | | 1000 |
| 11 | Max Area Uniformity | Anything >1 accepts large variation | 10 |
| 12 | Min Area Uniformity | 0 is minimum possible value | 0 |

For step 408, an R_tree clustering is applied to the filtered detection list generated previously in steps 402-406, in order to select SMF mine candidates with the expected spatial distribution. In particular, this operation rejects outlier MLOs that do not appear to be part of a minefield. Clustering parameters of step 408 are given in Table 4. This process generates the primary SMF list. The set of MLOs most likely to belong to a SMF.

TABLE 4

| # | Parameter | Description | "SMF detection Sample values |
|---|---|---|---|
| 1 | Group radius (grprad) | R_tree clustering radius (meters) approximate dimension of the SMY | 40 |
| 2 | MIN_MLO | Minimum number of MLOs required to declare a cluster | 4 |

With respect to clustering at step 408, the R_tree clustering technique is utilized to analyze the set of points to develop clusters within a certain radius. The R_tree clustering is one exemplary clustering technique or clustering algorithm that can be used to cluster the data. There are other clustering algorithms that could be used to find objects within a certain radius. With respect to the clustering parameters, it uses the group radius which provides clusters within a certain radius, such as 40 meters. Another clustering parameter is the minimum number of mine-like objects within that cluster, such as four. Essentially, this means that there should be at least four mine-like objects within 40 meters of each other in order for the technique to identify a cluster utilizing the R_tree clustering technique.

Step 410 may then augment the SMF list in which this process reattaches the spatially-spectrally similar MLOs as identified above to the primary SMF list. In particular, for each $MLO_i$ in the primary SMF list the set $\{MLO\_S_i\}$ is attached, and any duplicate MLOs are removed. The motivation here is not to exclude MLOs already determined be similar to the SMF candidate mines from the declared SMF. This step returns the augmented SMF list.

Step 412 defines the estimated boundary of the detected SMF. This is accomplished by calculating the confidence level ellipse, which may be set to the 99% confidence level for the augmented SMF list calculated previously.

Figure 5:
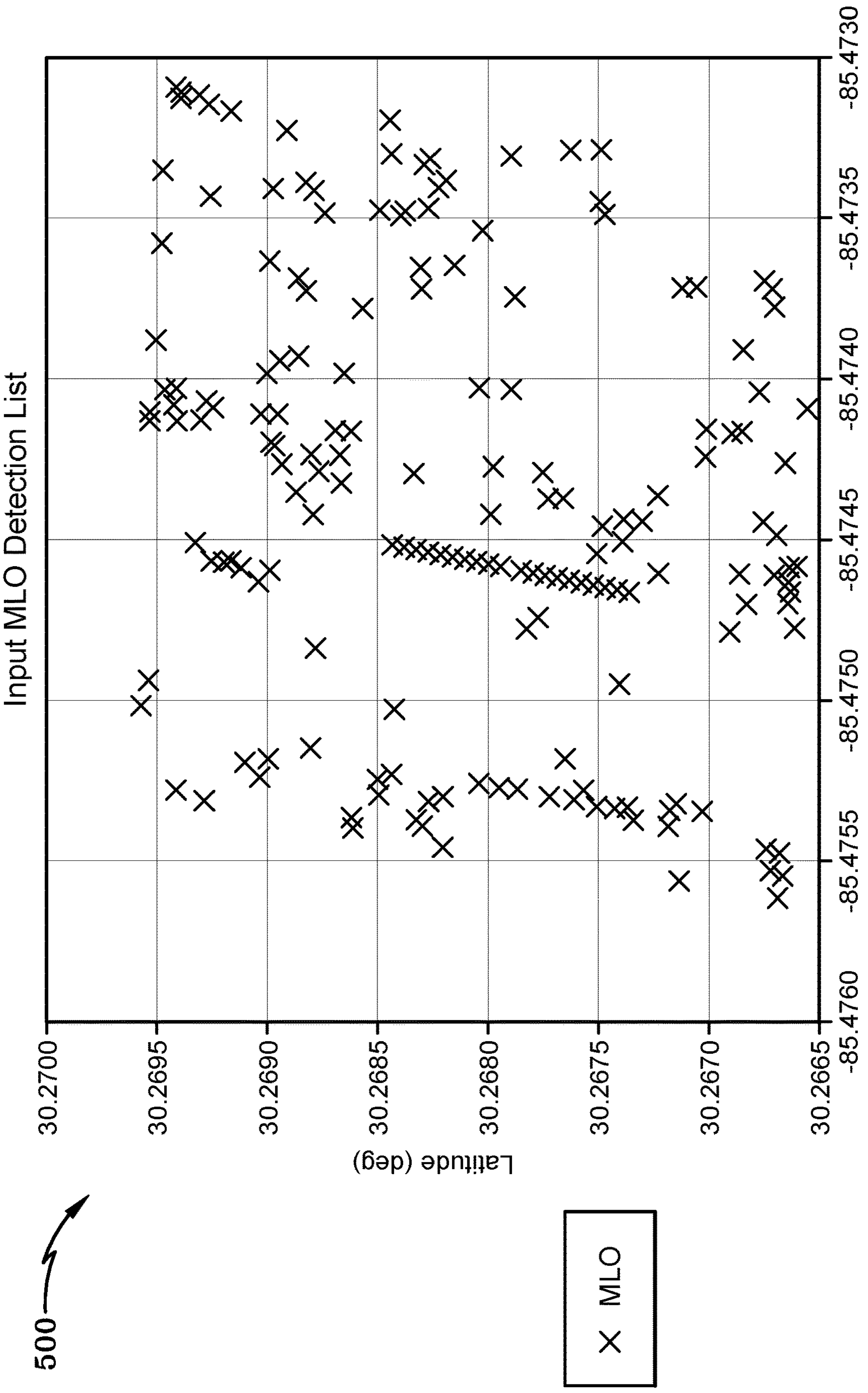
FIG. 5 is a graph of an exemplary input list of mine-like objects according to one aspect of the present disclosure.

FIG. 5 is a graphical representation of an exemplary input MLO detection list 500 that is input to the spatial spectral clustering of step 402. For this data set of the exemplary test, a ground truth was utilized to identify the position of an actual test ground mine 54.

Figure 6:
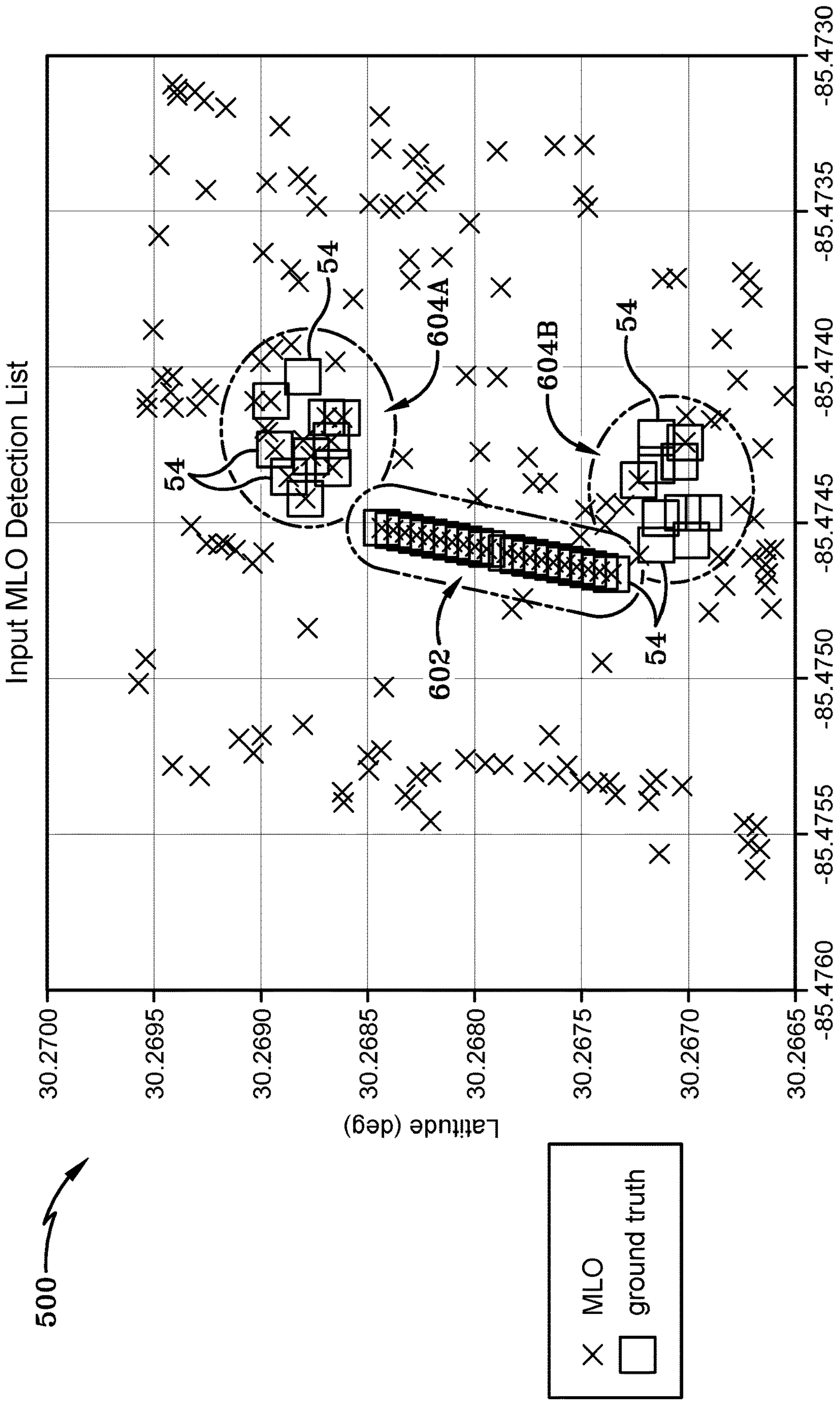
FIG. 6 is a graph of the exemplary input list of mine-like objects and identified ground truths from a test scenario according to one aspect of the present disclosure.

FIG. 6 depicts the ground truths (i.e., mines 54) and for this data set there is one mine line 602 and two SMFs 604A and 604B. In a first SMF 604A, there is a detected MLO 55 in all but one of the ground truth locations. In a second SMF 604B only two of the constituent ground truth points correspond to detections in the MLO list. For this reason, this example would expect only the first SMF 604A to be detectable.

Figure 7:
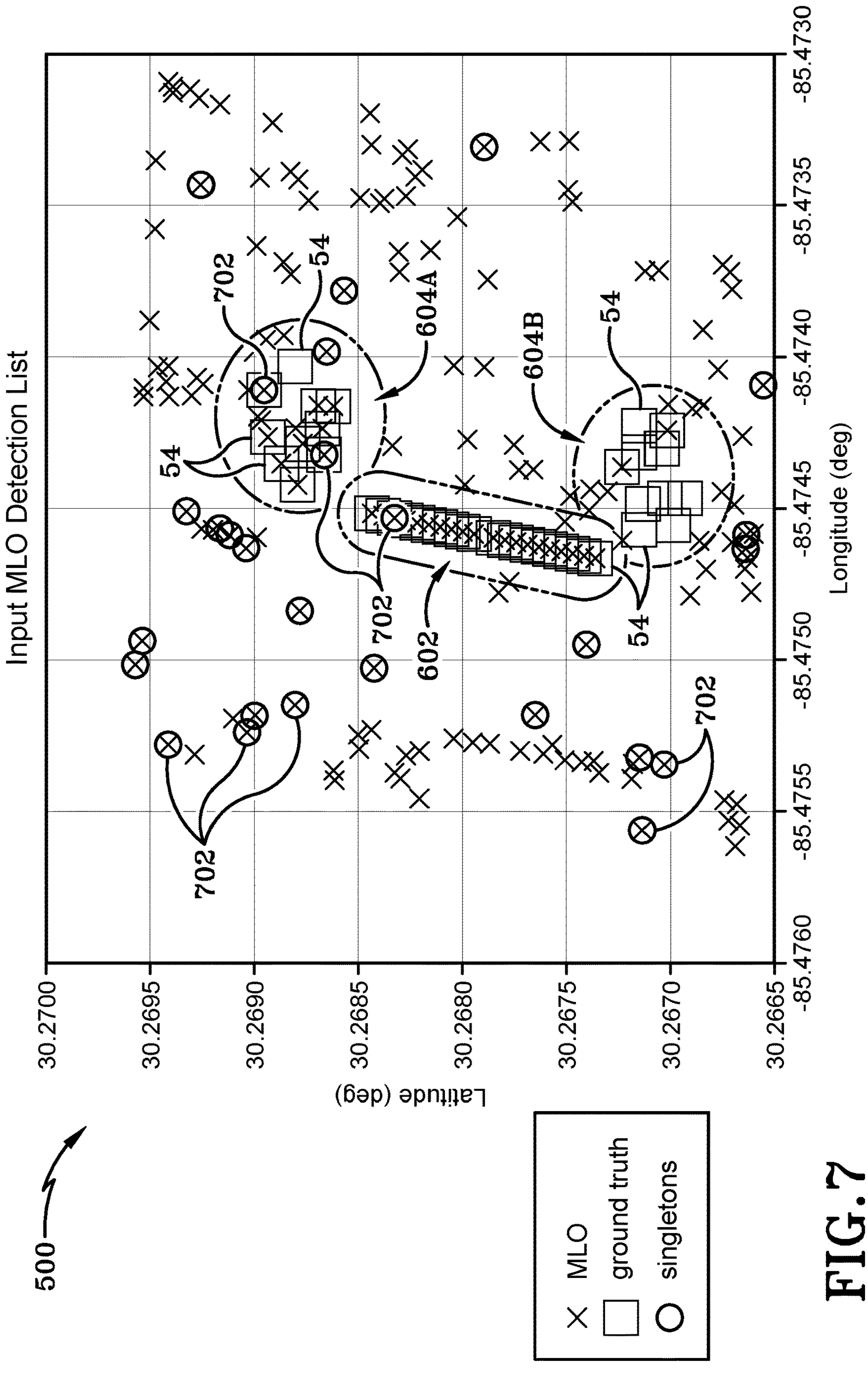
FIG. 7 is a graph of the exemplary input list of mine-like objects, identified ground truths, and singletons from a test scenario according to one aspect of the present disclosure.

Following the procedure described here for method 400, the spatial spectral cluster (step 402) is applied to the MLO list using the following parameter values: $Threshold_{S\text{-}sim}=0.75$, $Threshold_{Ssim}=30(m)$ and Mindet=3. Note that not all MLOs will find the minimum detection (Mindet) number of MLOs 55 within the thresholds. These MLOs are termed singletons 702 and are classified as background objects. FIG. 7 shows the resultant singleton distribution and shows singletons of mine-like objects. Singletons are referred to as potential objects that failed the number of detections in the clustering. Essentially, these singletons 702 are potential mine-like objects that are not within the number of detections that would qualify it to be part of a scattered minefield. Towards this end, the statistical likelihood is low that these singletons are actual mines.

Two examples of texture filtering (step 404), as described above are shown in FIG. 8 and FIG. 9.

Figure 8:
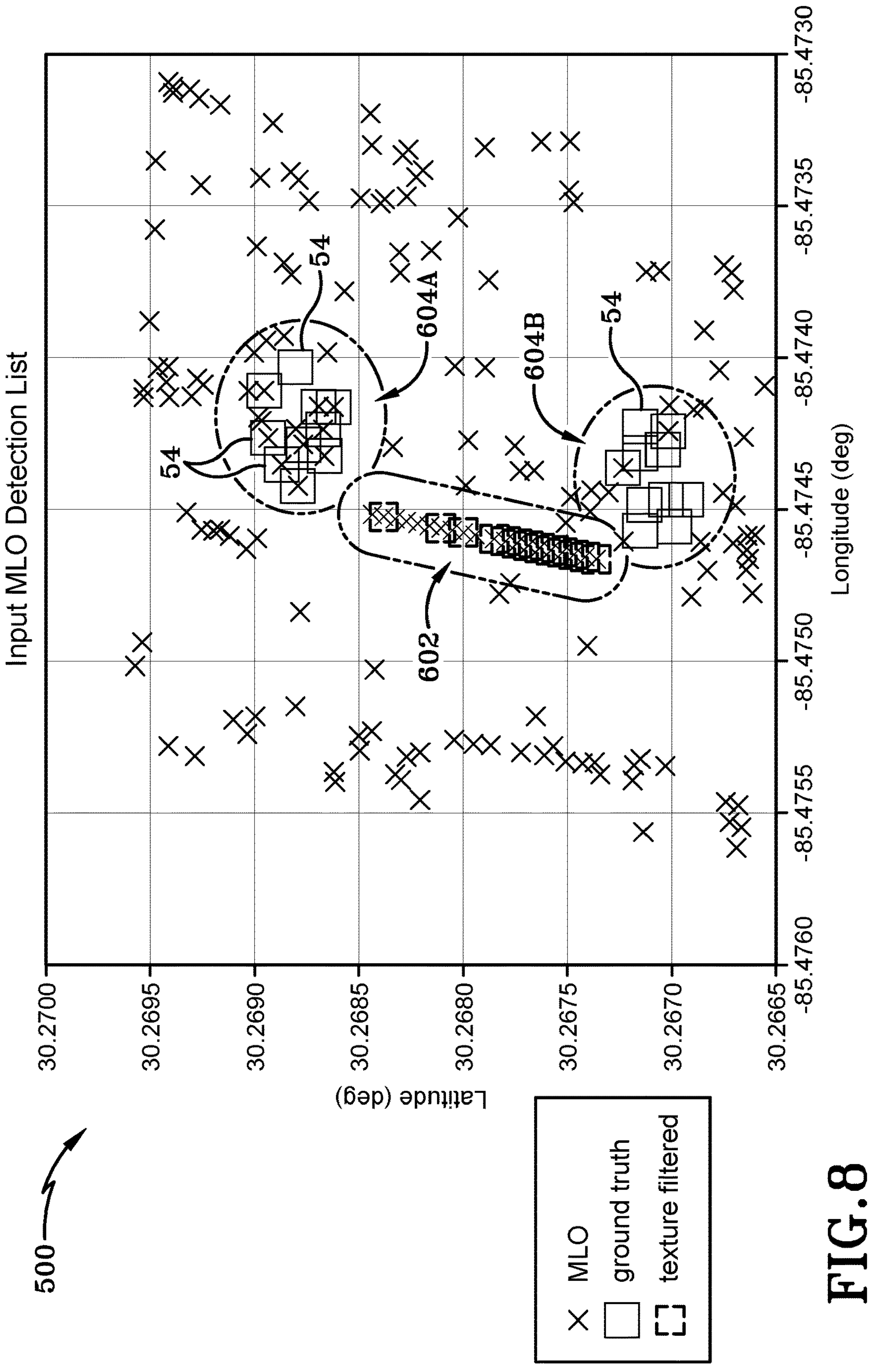
FIG. 8 is a graph of the exemplary input list of mine-like objects from a test scenario having been textured filtered to detect a mine line according to one aspect of the present disclosure.

FIG. 8 depicts that filter parameters are selected to reject isotropic distributions and selections for anisotropy were used. This results in selection of mine line 602 and rejects SMFs 604A and 604B, wherein this selection refers to step 406 of method 400.

Figure 9:
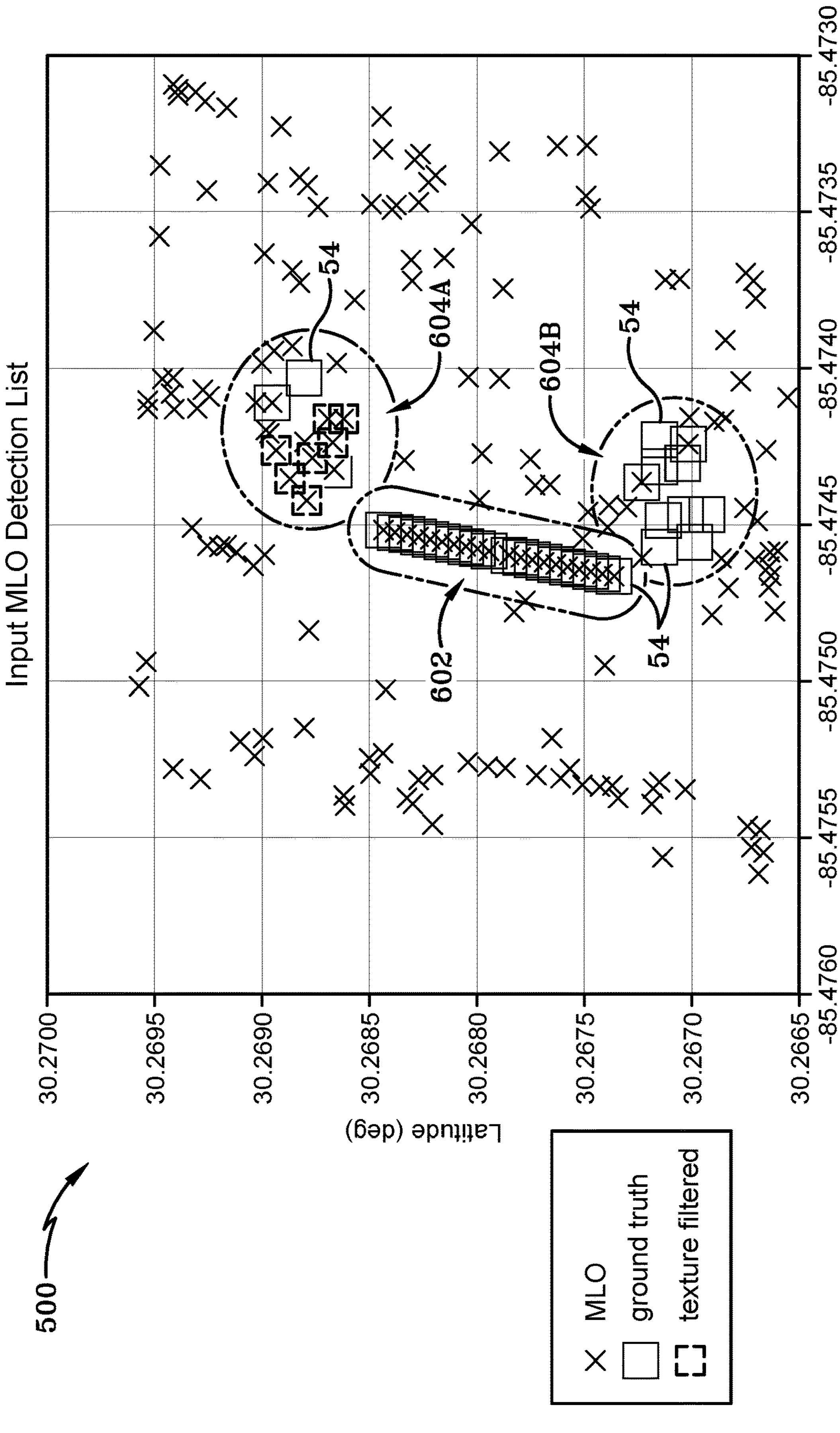
FIG. 9 is a graph of the exemplary input list of mine-like objects from a test scenario having been textured filtered to detect a scattered minefield according to one aspect of the present disclosure.

FIG. 9 depicts that baseline SMF parameters, as given in Table 3, were employed. Here, isotropic distribution are selected for SMF 604A, wherein MLOs are selected and mine line 602 MLOs are rejected, wherein this selection in this example refers to step 406 of method 400. Note however that some outlier MLOs are passed.

Figure 10:
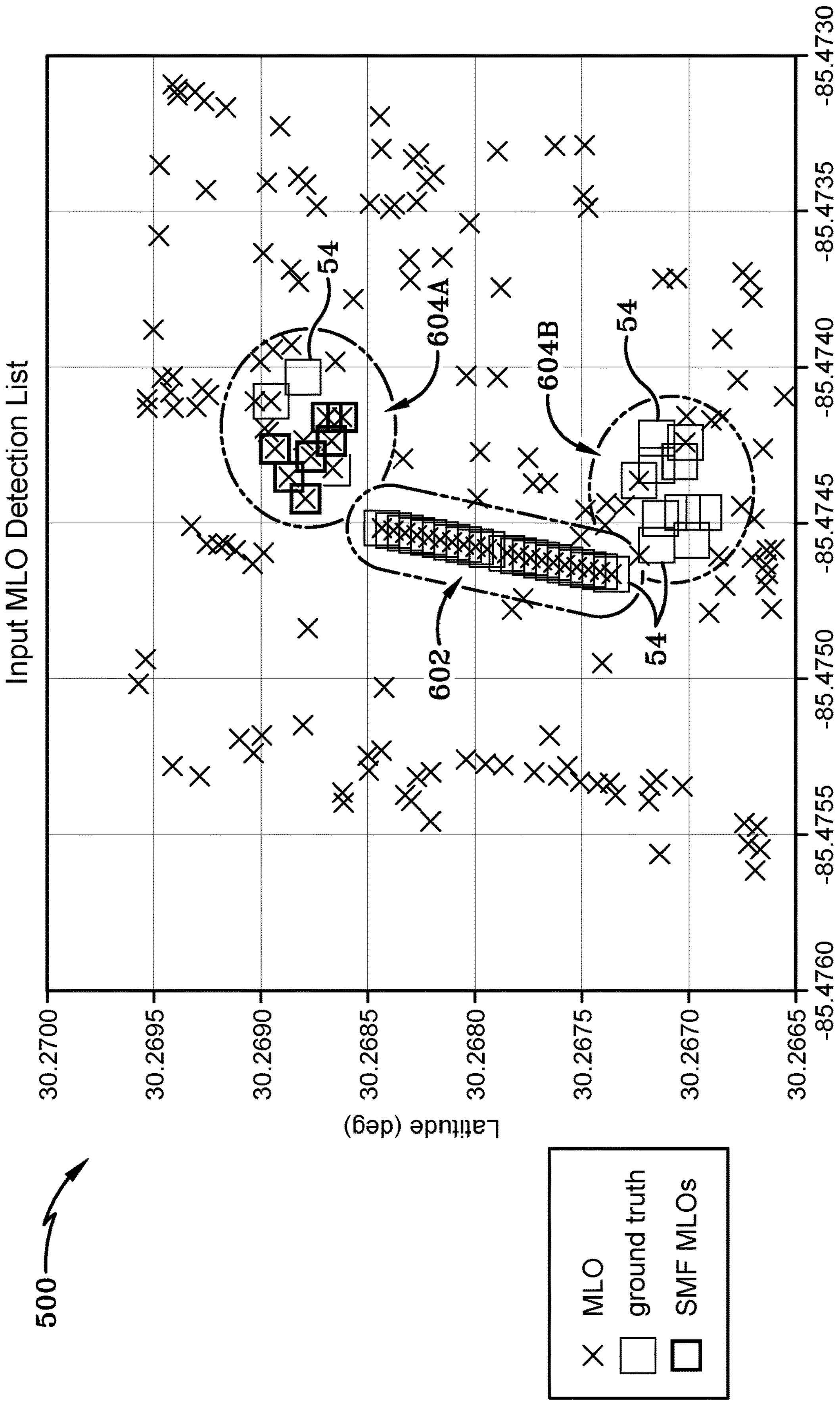
FIG. 10 is a graph of the exemplary input list of mine-like objects from a test scenario that details the mine-like objects in a scattered minefield according to one aspect of the present disclosure.

The outlier MLOs can be removed by a secondary clustering operation (step 408), as described above. FIG. 10 shows the result of this step when applied to the filtered MLO set of FIG. 9. Note that not all MLOs in the SMF have been detected. The output of this operation is a "detection group" which corresponds to a SMF. Wherein "detection group" refers to a list of all MLOs associated with the cluster. In this example only one detection group or SMF were found.

Figure 11:
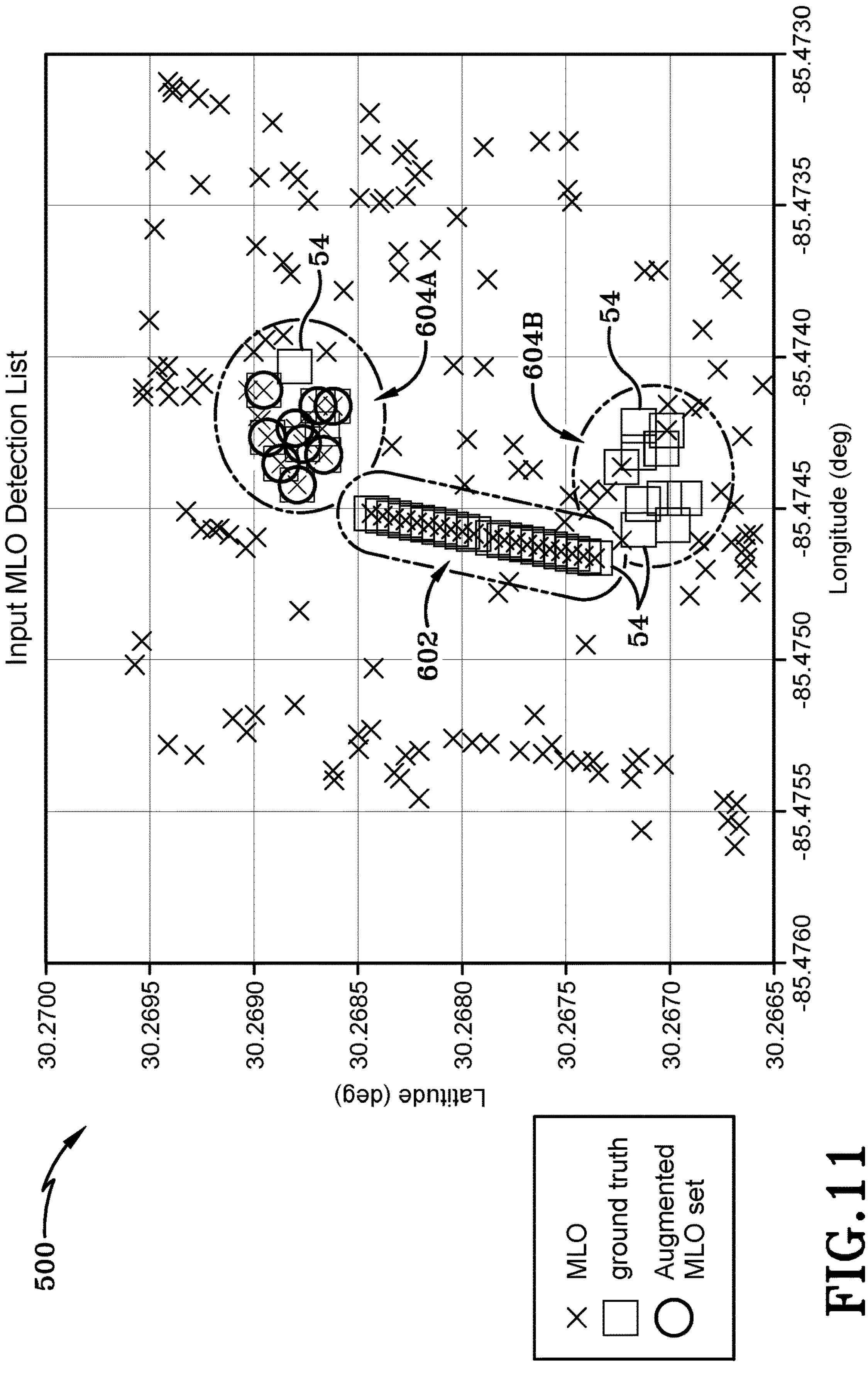
FIG. 11 is a graph of the exemplary input list of mine-like objects from a test scenario that details the augmented list of mine-like objects in a scattered minefield according to one aspect of the present disclosure.

In order to get achieve a better estimation of extend of the SMF in the MLO list (detection group) is augmented as described herein in step 410 of method 400. Results of augmenting the detections of FIG. 10 are shown in FIG. 11. Note that now all but one of the mines within the SMF are detected.

Figure 12:
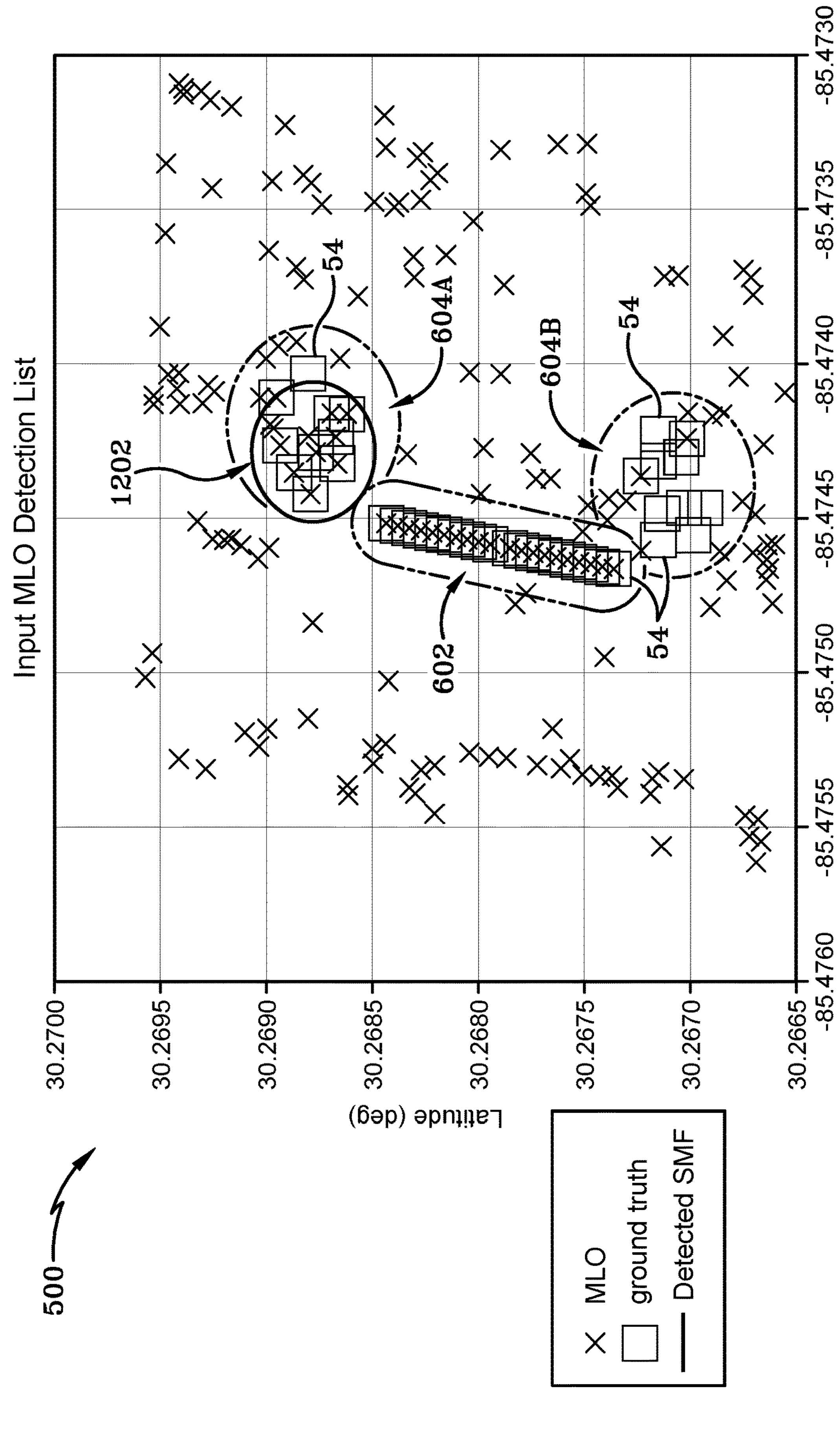
FIG. 12 is a graph of the exemplary input list of mine-like objects from a test scenario that details the cluster ellipse of mine-like objects in a scattered minefield according to one aspect of the present disclosure.

The final step 412 of method 400 is simply to draw the SMF boundary to the augmented list from step 410. The SMF boundary identifier 1202 defined as a confidence level ellipse drawn around the augmented MLO list. To be conservative, a 99% confidence level ellipse is recommended. This can be computed by standard methods. Results are shown in FIG. 12. Note that the boundary covers all mines in the SMF. In this example, the method located the SMF by only specifying the distribution statistics of the MLOs spatial-spectral group; Individual MLO properties were not specified.

Figure 13:
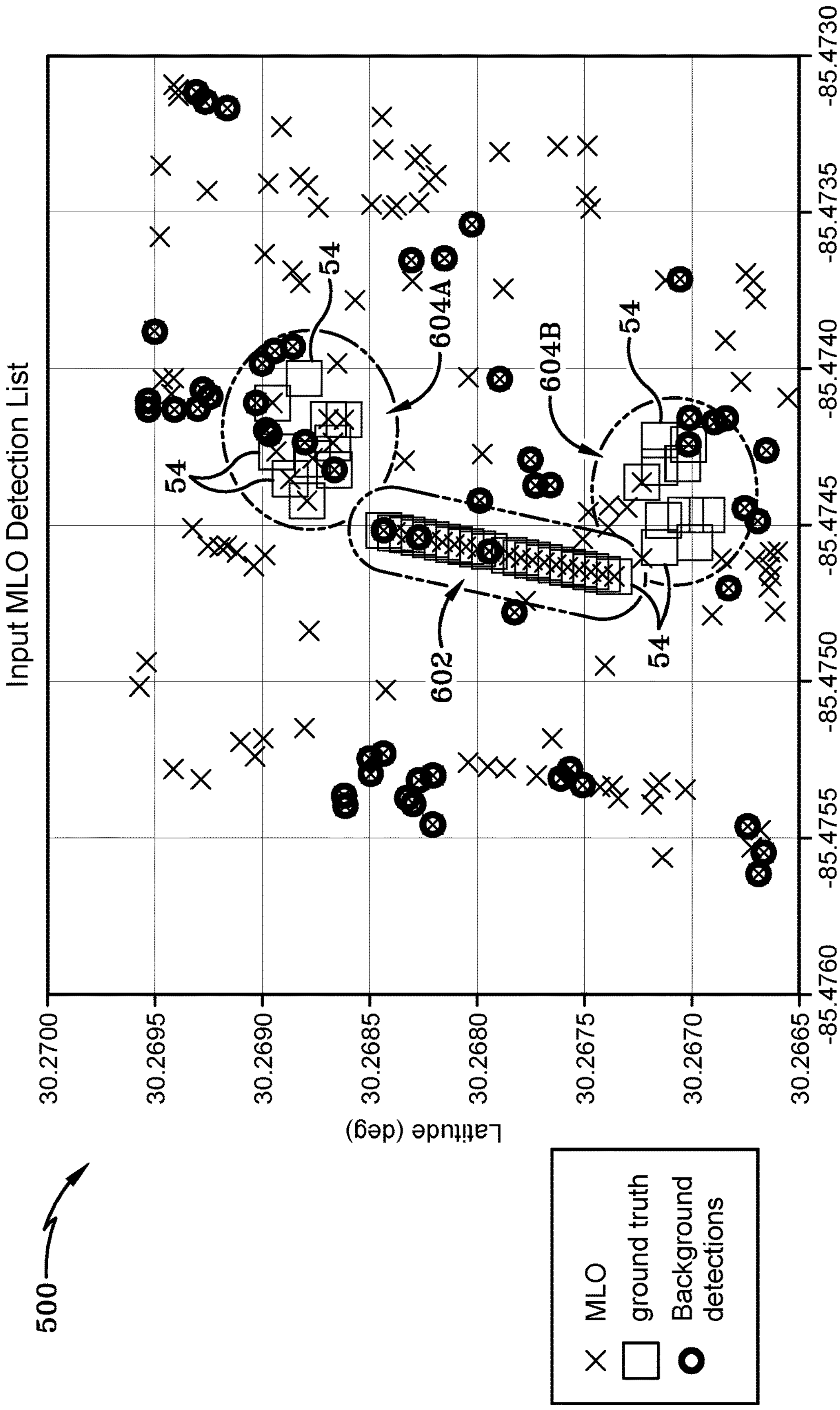
FIG. 13 is a graph of the exemplary input list of mine-like objects from a test scenario that details the use of the method as a background rejection filter according to one aspect of the present disclosure.

Alternatively, the SMF technique algorithm may also find use as a background rejection filter, filtering out MLOs with background distribution properties. An example is shown in FIG. 13 that identifies the background detections ("br detections") that are filtered out. The complete set of rejected background detections also includes the singletons 702 shown in FIG. 7

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:

obtaining at least one image from a passive image sensor mounted on a platform located above a surface, wherein the surface contains objects that are present in the image obtained from the passive image sensor;

classifying the objects based on object detections within the image, wherein the object detections are classified into one of at least two classes, wherein a first class is representative of mine-like objects (MLOs) and a second class is representative of non-mine-like objects;

estimating which of the object detections belong to the first class based on an estimation of a distribution process from which the MLOs are on the surface in the image obtained from the image sensor, and estimating which of the object detections belong to the second class based on an estimation of a distribution process from which the objects are on the surface in the image obtained from the passive image sensor; and determining, statistically, whether the object detections classified in the first class define a scattered minefield (SMF), wherein if it is statistically determined that the MLOs are a SMF, then classifying the SMF as a danger zone;

wherein the distribution process comprises classifying objects as one of Background MLOs, Patterned MLOs, and Scattered MLOs based on spatial characteristics of the objects present in the image obtained from the passive image sensor.

2. The method of claim 1, wherein determining the object detections classified in the first class comprises:

analyzing a spectra and a size of a test detection ($MLO_i$) from a set of object detections $\{MLO\_S_i\}$;

determining whether the test detection is part of the set of object detections with similar spectra and size; and analyzing the spectra and the size of each of the object detections in the set of object detections.

3. The method of claim 2, further comprising:

determining whether the set of object detections is within a distance parameter of the test detection.

4. The method of claim 3, further comprising:

clustering, statistically, spatial-spectral parameters of the test detection to the set of object detections to identify a population of object detections, wherein any other object detection ($MLO_j$) within the distance parameter of the test detection and within a spectral similarity threshold of the test detection is determined to be a member of the set of object detections.

5. The method of claim 2, further comprising:

estimating a distribution process of the set of object detections; and assigning the distribution process of the set of object detections to the test detection.

6. The method of claim 2, further comprising:

extracting texture parameters from the set of object detections that were assigned to the test detection.

7. The method of claim 2, further comprising:

detecting the SMF by determining at least one texture parameter in the object detections that is indicative that the test detection arose from a SMF-like distribution process; and testing each of the object detections in the set of object detections to determine if a pattern is consistent with that of the SMF.

8. The method of claim 7, further comprising:

applying spatial clustering to each of the object detections to identify the set of object detections;

calculating the at least one texture parameter from each of the object detections in the set of object detections and assigning the at least one texture parameter to the test detection.

9. The method of claim 7, further comprising:

filtering the set of object detections;

applying a clustering technique the filtered set of object detections based on the at least one texture parameter threshold to obtain a potential SMF cluster.

10. The method of claim 9, further comprising:

generating an augmented SMF mine set from the potential SMF cluster by reinserting spatially-spectrally similar detections to a primary SMF list.

11. The method of claim 10, further comprising:

determining whether the potential SMF cluster has spatial properties consistent with a SMF prediction, wherein if the potential SMF cluster has spatial properties consistent with the SMF prediction then classifying the potential SMF cluster as the SMF, and wherein if the potential SMF cluster does not have spatial properties consistent with the SMF prediction then classifying the potential SMF cluster as not the SMF.

12. The method of claim 11, further comprising:

if the potential SMF is determined to have spatial properties consistent with the SMF prediction, then estimating a boundary of the SMF.

13. The method of claim 12, wherein estimating the boundary of the SMF is accomplished by fitting a confidence level ellipse to the augmented SMF mine set.

14. A method comprising:

effecting an image to be obtained from an image sensor mounted on a platform above a surface, wherein the surface contains one or more mine like objects (MLOs) and the MLOs are present in the image obtained from the image sensor; and effecting a statistical determination of whether the MLOs define a scattered minefield (SMF) based on an estimation of a distribution process from which the MLOs are positioned on the surface in the image obtained from the image sensor;

wherein if it is statistically determined that the MLOs are a SMF, then effecting the SMF to be classified as a danger zone wherein the distribution process comprises classifying objects as one of Background MLOs, Patterned MLOs, and Scattered MLOs based on spatial characteristics of the objects present in the image obtained from the passive image sensor.

15. The method of claim 14, wherein effecting the statistical determination of whether the MLOs define the SMF comprises:

effecting a spectra and a size of a test MLO ($MLO_i$) from a set of MLOs $\{MLO\_S_i\}$ to be analyzed;

effecting a determination of whether the test MLO is part of the set of MLOs with similar spectra and size; and effecting the spectra and the size of each MLO in the set of MLOs to be analyzed.

16. The method of claim 15, further comprising:

effecting detection the SMF from a determination of at least one texture parameter in the MLOs that is indicative that the test MLO arose from a SMF-like distribution process; and effecting each MLO in the set of MLOs to be tested to determine if a pattern is consistent with that of the SMF.

17. The method of claim 16, further comprising:

effecting spatial clustering to be applied to each MLO to identify the set of MLOs;

effecting texture parameters to be calculated from each MLO in the set of MLOs and assigning the texture parameters to the test MLO.

18. The method of claim 17, further comprising:

effecting a clustering technique to be applied the set of MLOs that have been filtered based on at least one texture parameter threshold to obtain a potential SMF cluster;

effecting an augmented SMF mine set from the potential SMF cluster to be generated by reinserting spatially-spectrally similar MLOs to a primary SMF list;

effecting a determination of whether the potential SMF cluster has spatial properties consistent with a SMF prediction, wherein if the potential SMF cluster has spatial properties consistent with the SMF prediction then effecting a classification that the potential SMF cluster as the SMF, and wherein if the potential SMF cluster does not have spatial properties consistent with the SMF prediction then effecting a classification that the potential SMF cluster is not the SMF;

if the potential SMF is determined to have spatial properties consistent with the SMF prediction, then effecting a boundary of the SMF to be estimated; wherein estimation of the boundary of the SMF is accomplished by effecting a confidence level ellipse to be fitted to the augmented SMF mine set.

19. An object classification system comprising:

a platform;

a passive sensor carried by the platform, wherein the passive image sensor is configured to image a landscape containing objects;

classification logic in operative communication with the passive sensor, the classification logic configured to classify the objects based on detections within the image, wherein the classification logic classifies the detections into one of at least two classes, wherein a first class is representative of mine-like objects (MLOs) and a second class is representative non-mine-like objects;

the classification logic configured to estimate which of the detections belong to the first class based on an estimation of a distribution process from which the MLOs are positioned in the landscape in the image obtained from the passive image sensor, and estimate which of the detections belong to the second class based on an estimation of a distribution process from which the objects are positioned in the landscape in the image obtained from the passive image sensor; and the classification logic configured to determine, statistically, whether the detections classified in the first class define a scattered minefield (SMF), wherein if it is statistically determined that the MLOs are the SMF, then the classification logic is configured to classify the SMF as a danger zone.

20. The object classification system of claim 19, further comprising:

the classification logic further configured to analyze a spectra and a size of a test detection ($MLO_i$) from a set of detections $\{MLO\_S_i\}$, determine whether the test detection is part of the set of detections with similar spectra and size, and analyze the spectra and the size of each of the detections in the set of detections;

the classification logic configured to determine whether the set of detections is within a distance parameter of the test detection;

the classification logic configured to cluster, statistically, spatial-spectral parameters of the test detection to the set of detections to identify a population of the detections, wherein any other detection ($MLO_j$) within the distance parameter of the test detection and within a spectral similarity threshold of the test detection is determined to be a member of the set of detections;

the classification logic configured to estimate a distribution process of the set of detections, and assign the distribution process of the set of detections to the test detection; and the classification logic configured to extract texture parameters from the set of detections that were assigned to the test detection.

* * * * *